United States Patent
Tochihara

(10) Patent No.: US 10,035,417 B2
(45) Date of Patent: Jul. 31, 2018

(54) FUEL VAPOR GAS PURGE SYSTEM

(71) Applicant: Hamanakodenso Co., Ltd., Kosai, Shizuoka-pref. (JP)

(72) Inventor: Hideya Tochihara, Kosai (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 97 days.

(21) Appl. No.: 15/341,017

(22) Filed: Nov. 2, 2016

(65) Prior Publication Data

US 2017/0129329 A1    May 11, 2017

(30) Foreign Application Priority Data

Nov. 10, 2015 (JP) .................................. 2015-220545

(51) Int. Cl.
   *B01D 53/02* (2006.01)
   *B60K 15/035* (2006.01)
   (Continued)

(52) U.S. Cl.
   CPC .... *B60K 15/03504* (2013.01); *B01D 53/0407* (2013.01); *B01D 53/0454* (2013.01);
   (Continued)

(58) Field of Classification Search
   CPC ............ B01D 53/0407; B01D 53/0454; B60K 15/03504; B60K 15/03519; B60K 2015/0319; B60K 2015/03243; B60K 2015/03514; F02D 41/0037; F02D 41/004; F02M 25/08; F02M 25/0809; F02M 25/0836; F02M 25/089; F02M 35/10; F02M 35/10222
   See application file for complete search history.

(56) References Cited

U.S. PATENT DOCUMENTS 3,888,223 A * 6/1975 Mondt ..................... F02M 1/16
                                                                123/519
4,630,581 A * 12/1986 Shibata ............... F02D 41/0032
                                                                123/325
(Continued)

FOREIGN PATENT DOCUMENTS

EP        1901382 A2    3/2008
JP     2002-349364 A   12/2002
JP        4082004 B2    4/2008

*Primary Examiner* — Christopher P Jones
(74) *Attorney, Agent, or Firm* — Harness, Dickey & Pierce, P.L.C.

(57) ABSTRACT

A fuel vapor gas purge system includes a passage forming member forming an intake passage of an internal combustion engine, a valve device being attached to the passage forming member and including a valve element switchable between an allowed state in which the vaporized fuel is allowed to flow into the intake passage and a blocked state in which the flow of the vaporized fuel into the intake passage is blocked, an electric circuit energized to generate a driving force to drive the valve element into the allowed state or the blocked state, a switch portion including an electric contact portion that causes the electric circuit to be in a conductive state when the valve device is attached to the passage forming member, and causes the electric circuit to be in a nonconductive state when the valve device is detached from the passage forming member.

5 Claims, 6 Drawing Sheets

(51) Int. Cl.
*F02M 25/08* (2006.01)
*B01D 53/04* (2006.01)
*F02M 35/10* (2006.01)
B60K 15/03 (2006.01)
F02D 41/00 (2006.01)

(52) U.S. Cl.
CPC ...... *B60K 15/03519* (2013.01); *F02D 41/004* (2013.01); *F02M 25/08* (2013.01); *F02M 25/089* (2013.01); *F02M 25/0809* (2013.01); *F02M 25/0836* (2013.01); *F02M 35/10* (2013.01); *F02M 35/10222* (2013.01); *B60K 2015/0319* (2013.01); *B60K 2015/03243* (2013.01); *B60K 2015/03514* (2013.01); *F02D 41/0037* (2013.01)

(56) References Cited

U.S. PATENT DOCUMENTS

| | | | | |
|---|---|---|---|---|
| 4,768,566 A | * | 9/1988 | Ito | B60K 15/04 137/588 |
| 4,887,578 A | * | 12/1989 | Woodcock | B60K 15/03504 123/516 |
| 5,501,198 A | * | 3/1996 | Koyama | F02M 25/0809 123/198 D |
| 5,911,209 A | * | 6/1999 | Kouda | F02M 25/0809 123/198 D |
| 2002/0162457 A1 | | 11/2002 | Hyodo et al. | |
| 2008/0057374 A1 | | 3/2008 | Kurosawa | |
| 2014/0032041 A1 | | 1/2014 | Widmann et al. | |
| 2015/0013437 A1 | | 1/2015 | Takakura | |

* cited by examiner

FUEL VAPOR GAS PURGE SYSTEM

CROSS REFERENCE TO RELATED APPLICATION

This application is based on and incorporates herein by reference Japanese Patent Application No. 2015-220545 filed on Nov. 10, 2015.

TECHNICAL FIELD

The present disclosure relates to a fuel vapor gas purge system that supplies vaporized fuel from a canister to an intake pipe in an automobile.

BACKGROUND

A device disclosed in Patent Document 1 (JP 4082004 B2 corresponding to US 2002/0162457 A1) is known as an example of a conventional fuel vapor gas purge system. The system of Patent Document 1 supplies fuel vapor stored in a canister to an intake passage of an engine through a purge passage by opening a purge control valve and rotating a purge pump positively during an operation of the engine.

According to the system of Patent Document 1, when the purge control valve is detached from the intake passage during the positive rotation of the purge pump, a vaporized fuel may leak to outside.

SUMMARY

It is an objective of the present disclosure to provide a fuel vapor gas purge system capable of limiting leakage of vaporized fuel to outside when a valve device is detached.

It is another objective of the present disclosure to provide a fuel vapor gas purge system capable of limiting false detection of abnormality in a valve device.

According to an aspect of the present disclosure, a fuel vapor gas purge system includes a fuel tank, a canister, a passage forming member, a purge pump, a valve device, an electric circuit, and a switch portion. The fuel tank accumulates a fuel, and the canister adsorbs a vaporized fuel when a fuel vapor gas generated in the fuel tank is introduced into the canister, and is capable of desorbing the adsorbed vaporized fuel. The passage forming member forms an intake passage of an internal combustion engine. The internal combustion engine mixes and combusts the vaporized fuel desorbed from the canister and a combustion fuel. The purge pump pumps the vaporized fuel in the canister to the intake passage through a purge passage. The valve device includes a valve element switchable between an allowed state in which the vaporized fuel is allowed to flow into the intake passage and a blocked state in which the flow of the vaporized fuel into the intake passage is blocked. The valve device is attached to the passage forming member and controls a flow of the vaporized fuel pumped by the purge pump. The electric circuit is disposed in the valve device and energized to generate a driving force to drive the valve element. The electric circuit is capable of driving the valve element into the blocked state when the driving force is not generated or into the allowed state when the driving force is generated. The switch portion includes an electric contact portion that causes the electric circuit to be in a conductive state in which the electric circuit is closed when the valve device is attached to the passage forming member, and causes the electric circuit to be in a nonconductive state in which the electric circuit is open when the valve device is detached from the passage forming member.

According to the fuel vapor gas purge system, when the valve device is attached to the passage forming member, the electric circuit is set in the conductive state by the switch portion. Thus, upon the energization of the electric circuit, the valve element can be switched into the allowed state. On the other hand, when the valve device is detached from the passage forming member, the electric circuit is set in the nonconductive state by the switch portion. Even upon the energization of the electric circuit, the valve element is switched into the blocked state. Accordingly, even when the valve device is, for example, detached from the intake passage of the internal combustion engine, the vaporized fuel from the canister is sealed in the valve device in the blocked state. Thus, leakage of the vaporized fuel from a detached part can be avoided. Therefore, the fuel vapor gas purge system is capable of limiting the leakage of the vaporized fuel to outside when the valve device is, for example, detached from the passage forming member.

The fuel vapor gas purge system may include a controller controlling an operation of the purge pump and the energization of the electric circuit. The controller may acquire a first pressure value and a second pressure value. The first pressure value may be acquired by detecting a pressure at a predetermined position of a passage from an inner part or a fill opening of the fuel tank to the valve device after a predetermined time period of the operation of the inner pump without performing the energization of the electric circuit. The second pressure value may be acquired by detecting an inner pressure of the fuel tank with stopping the operation of the inner pump and with performing the energization of the electric circuit subsequent to the acquisition of the first pressure value. The controller may determine that the valve device is in an abnormal state when the second pressure value does not change sharply from the first pressure value.

Accordingly, the system is capable of detecting whether the valve device is in the abnormal state, for example, detached, by comparing the first pressure value and the second pressure value. The first pressure value is detected with performing the operation of the purge pump and stopping the energization of the valve device to be in a closed state. The second pressure value is detected with performing the energization of the electric circuit and stopping the operation of the purge pump subsequent to the detection of the first pressure value. The first pressure value is a detection value when the purge pump is operated in the closed state of the valve device. The second pressure value is a detection value when the purge pump is stopped in an open state of the valve device. When the valve device is in a normal state, for example, when there is no gas leakage from the purge passage, the sealed vaporized fuel is capable of transferring to the intake passage through the valve device in the open state. Hence, the second pressure value rapidly approaches the atmosphere pressure.

On the other hand, when the valve device is detached from the passage forming member, the valve device becomes actually in the closed state despite controlling of the valve device into the open state. Thus, the vaporized fuel remains sealed in the passage closed by the valve device. Accordingly, the controller is capable of detecting appropriately that the valve device is in the abnormal state, for example, detached when the second pressure value is not much different from the first pressure value. Therefore, the fuel vapor gas purge system is capable of limiting false detection of abnormality in the valve device.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
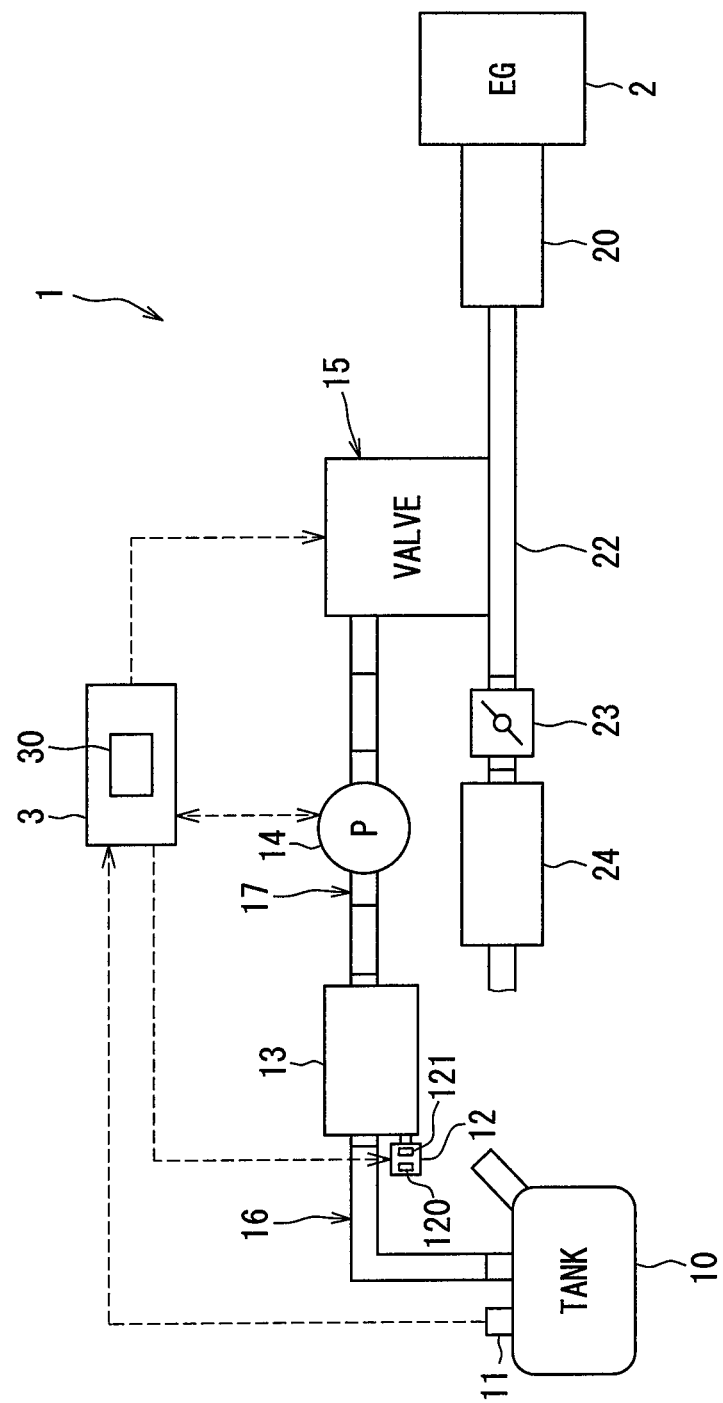
FIG. 1 is a schematic diagram illustrating a fuel vapor gas purge system according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A fuel vapor gas purge system 1 according to a first embodiment will be described referring to FIGS. 1 to 5. The fuel vapor gas purge system 1 supplies HC gas or the like contained in a fuel adsorbed to a canister 13 to an intake passage of an internal combustion engine. The fuel vapor gas purge system 1 prevents a fuel vapor gas (hereinafter, may be referred to as vaporized fuel) generated in a fuel tank 10 from being released to an atmosphere. The fuel vapor gas purge system 1 may be referred to as a "system 1". The system 1 includes, as shown in FIG. 1, an intake system comprising the intake passage of an internal combustion engine 2, and a vaporized fuel purging system that supplies the vaporized fuel to the intake system of the internal combustion engine 2.

The vaporized fuel introduced into the intake passage of the internal combustion engine 2 is mixed with a combustion fuel supplied from an injector or the like to the internal combustion engine 2. The mixed fuel is combusted in a cylinder of the internal combustion engine 2. The internal combustion engine 2 mixes and combusts the vaporized fuel desorbed from the canister 13 and the combustion fuel. In the intake system of the internal combustion engine 2, an intake manifold 20 is connected to an intake pipe 22, and a throttle valve 23 and an air filter 24 are provided in the intake pipe 22. The intake passage of the internal combustion engine 2 includes the intake manifold 20, the intake pipe 22, the throttle valve 23 and the air filter 24.

In the vaporized fuel purging system, the fuel tank 10 and the canister 13 are connected by a pipe forming a vapor passage 16, and the canister 13 and the intake pipe 22 are connected through a purge valve 15 and a pipe forming a purge passage 17. A purge pump 14 is provided in the purge passage 17. The purge passage 17 includes an inner passage of the purge pump 14 and an inner passage of the purge valve 15. The intake pipe 22 is used as an example of a passage forming member forming the intake passage of the internal combustion engine 2.

The air filter 24 is provided upstream of the intake pipe 22 and traps grit and dust contained in an intake air. The throttle valve 23 is an intake-amount regulation valve that regulates an open degree of an inlet portion of the intake manifold 20 to adjust an amount of the intake air flowing into the intake manifold 20. The intake air passes through the air filter 24 and the throttle valve 23 in this order, and flows into the intake manifold 20. The intake air is, subsequently, mixed with the combustion fuel injected from the injector or the like at a predetermined air-fuel ratio to be combusted in the cylinder.

The fuel tank 10 is a container accumulating a fuel such as gasoline. The fuel tank 10 is connected to an inlet portion of the canister 13 by a pipe forming the vapor passage 16. The canister 13 is a container in which an adsorbent such as an activated carbon is sealed. The vaporized fuel generated in the fuel tank 10 is introduced into the canister 13 through the vapor passage 16 and is adsorbed to the adsorbent temporarily. The canister 13 is provided integrally with a valve module 12. The valve module 12 includes inside a canister close valve 120 opening or closing a suction portion through which a fresh air of outside is taken in, and an inner pump 121 capable of releasing gas to the atmosphere or sucking air from the atmosphere. The canister close valve 120 may be referred to also as a CCV 120. Since the canister 13 includes the CCV 120, an atmosphere pressure can be applied to the canister 13. Thus, the vaporized fuel adsorbed to the adsorbent of the canister 13 can be desorbed, i.e. purged easily by the suctioned fresh air.

The canister 13 has an outflow portion through which the vaporized fuel desorbed from the adsorbent flows out of the canister 13, and the outflow portion of the canister 13 is connected to an end of a pipe forming a part of the purge passage 17. Another end of the pipe is connected to an inflow portion of the purge pump 14. The purge pump 14 and the purge valve 15 are connected via a pipe forming another part of the purge passage 17. The purge pump 14 is a fluid driving device that includes a turbine rotated by an actuator such as a motor. The purge pump 14 pumps the vaporized fuel from the canister 13 to the intake passage of the internal combustion engine 2.

The purge valve 15 is an opening and closing device including a valve element 152 that opens or closes the purge passage 17, i.e. a fuel supply passage 153 provided inside a main body 150 of the purge valve 15. Hence, the purge valve 15 is capable of allowing or blocking supply of the vaporized fuel from the canister 13 to the internal combustion engine 2. The purge valve 15 includes an electromagnetic valve device that includes the valve element 152, an electromagnetic coil 151 and a spring. The purge valve 15 is switchable between an energized state and a non-energized state by a controller 3, and accordingly, an open degree of the purge valve 15 is adjusted between a fully open state and a fully closed state. The purge valve 15 moves the valve element 152 in accordance with a difference between an electromagnetic force generated upon an energization of an electric circuit 1510 including the electromagnetic coil 151 and an urging force of the spring. The purge valve 15 opens the fuel supply passage 153 by separating the valve element 152 from a valve seat formed on the main body 150.

The purge valve 15 maintains the fuel supply passage 153 in a closed state normally. When a voltage is not applied to the purge valve 15, the purge valve 15 is in a closed state where the fuel supply passage 153 is closed. When a voltage is applied to the purge valve 15, the purge valve 15 is controlled to be in an open state where the fuel supply passage 153 is open. Thus, the purge valve 15 is a so-called normally closed type valve device. The purge valve 15 is used as an example of a valve device that is capable of allowing or blocking inflow of the vaporized fuel from a purge passage to the intake passage inside the intake pipe 22. The purge passage extends from an inner part of the fuel tank 10 to a connection portion connected to the intake passage of the internal combustion engine 2. Such valve device may be constituted by a valve device other than the purge valve 15 adjustable in open degree continuously. For example, the valve device may be constituted by an open-close valve that is switched into a fully-open state or a fully-closed state. In this case, the open-close valve is attached as the valve device to the intake pipe 22, and the purge valve 15 is disposed in a passage between the fuel tank 10 and the open-close valve.

In the purge valve 15, when the electric circuit 1510 is energized by the controller 3, the electromagnetic force becomes larger than an elastic force of the spring, and the valve element 152 is separated from the valve seat. Accordingly, the fuel supply passage 153 is opened. The controller 3 performs an energization of the electromagnetic coil 151 with controlling a duty ratio that is a ratio of energization time period to a single periodic time frame consisting of the energization time period and non-energization time period. The purge valve 15 is a so-called duty control valve. A flow amount of the vaporized fuel through the fuel supply passage 153 is adjusted by such energization control (i.e. duty control) of the purge valve 15.

Figure 2:
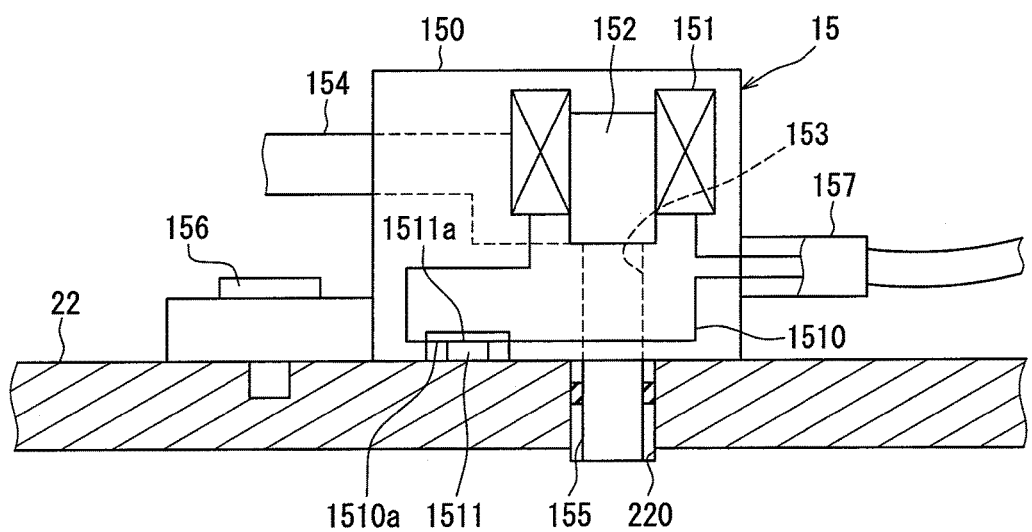
FIG. 2 is a schematic diagram illustrating a connection structure between a purge valve and an intake pipe in the fuel vapor gas purge system according to the first embodiment.

The system 1 includes the valve device attached to the intake pipe 22 that is used as the passage forming member forming the intake passage. As shown in FIG. 2, the purge valve 15 which is used as an example of the valve device includes a configuration in which the main body 150 is fastened to the intake pipe 22 by a fastening portion 156. The fastening portion 156 is constituted by a fastening device such as a screw, a bolt or a bracket. Inside the main body 150, the electromagnetic coil 151, the electric circuit 1510, the valve element 152 and the fuel supply passage 153 are provided, for example. The main body 150 includes an inflow port 154 through which the vaporized fuel from the canister 13 flows in, and an outflow port 155 communicating with the inflow port 154 through the fuel supply passage 153. When the valve device is appropriately attached to the intake pipe 22 as shown in FIG. 2, the outflow port 155 is inserted inside an engine port 220 of the intake pipe 22 so as to extend through the intake pipe 22 and be connected to the intake passage. An outside of the intake pipe 22 and the intake passage communicate with each other through the engine port 220 of the intake pipe 22. A gap between an outer circumferential surface of the outflow port 155 and an inner circumferential surface of the engine port 220 is sealed by a sealing member such as an O ring.

The electric circuit 1510 is connected to a connector 157 for wire connection when a current is supplied from outside. Thus, the electric circuit 1510 is energized through the electric wire. The electric circuit 1510 includes a contact terminal 1510a that is located intermediately of the electric circuit 1510 and is switchable between a conductive state and a nonconductive state. The contact terminal 1510a is set to be either the conductive state where the electric circuit 1510 is closed or the nonconductive state where the electric circuit 1510 is open, by a switch portion 1511 provided in the valve device or the intake pipe 22.

When the valve device is appropriately attached to the intake pipe 22 as shown in FIG. 2, a contact portion 1511a of the switch portion 1511 is in contact with the contact terminal 1510a, and thereby forms the conductive state of the electric circuit 1510. The contact terminal 1510a is made of a conductive material that is capable of being energized. In this case, the electric circuit 1510 becomes an energized state via the electric wire connected by the connector 157, and accordingly, the electromagnetic coil 151 generates an electromagnetic force. The electromagnetic force drives the valve element 152 to open the fuel supply passage 153.

Figure 3:
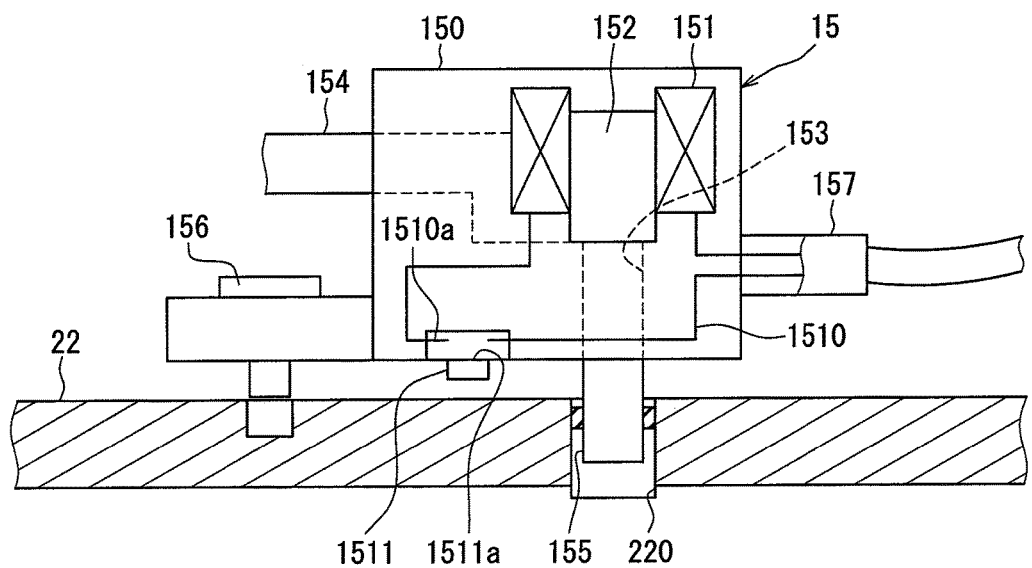
FIG. 3 is a schematic diagram illustrating a state where the purge valve is detached from the intake pipe.

As shown in FIG. 3, when a fastening force of the fastening portion 156 does not function appropriately for example, and when the valve device is detached from the intake pipe 22, the contact portion 1511a and the contact terminal 1510a are separated from each other. In this case, the electric circuit 1510 becomes open, and thereby forms the nonconductive state where the energization is shut off. Since a current dose not flow through the electric circuit 1510, the electromagnetic force is not generated, and the valve element 152 closes the fuel supply passage 153. Therefore, when the valve device is detached from the intake pipe 22, the valve element 152 is in a closed state, and a flow of the vaporized fuel is blocked inside the valve device, thereby providing a closed passage from the inner part of the fuel tank 10 to the inner part of the valve device.

The controller 3 is an electronic control unit of the fuel vapor gas purge system 1. The controller 3 includes at least one central processing unit (CPU), and at least one memory device as a storage medium storing a program and data. The controller 3 is provided by a microcomputer including a storage medium that is readable by a computer. The storage medium is a non-transitory tangible storage medium that stores non-temporarily a program that is readable by a computer. The storage medium may be provided by a semiconductor memory or a magnetic disc. The controller 3 may be provided by a single computer or a set of computer resources linked with each other via a data communication device. The program is executed by the controller 3 such that the controller 3 functions as a device disclosed in the specification of the present application, and the controller 3 functions to perform methods disclosed in the specification of the present application.

The method or functions provided by the control system may be provided by software recorded in a tangible memory device and a computer executing the software, only by the software, only by hardware, or by a combination of them. For example, when the controller 3 is provided by hardware of an electric circuit, the controller 3 can be provided by a digital circuit including multiple logic circuits or an analog circuit.

The controller 3 performs not only a basic control such as fuel purging in the system 1 but also abnormality determination such as detachment of the purge valve 15 and leakage of the vaporized fuel from the passage by using an abnormality determination circuit 30 used as an abnormality determiner. Therefore, the controller 3 is connected to and controls each actuator of the purge pump 14, the purge valve 15, the CCV 120 and the inner pump 121.

The controller 3 is connected to a motor of the purge pump 14, and is capable of controlling a running and stopping of the purge pump 14 by driving the motor regardless of running or stopping of the internal combustion engine 2. The controller 3 is connected to a motor of the inner pump 121, and is capable of controlling a running and stopping of the inner pump 121 by driving the motor regardless of running or stopping of the internal combustion engine 2. The controller 3 has an input port to which signals corresponding to a rotation speed of the internal combustion engine 2, a suction air amount, a coolant temperature, and an inner pressure of the fuel tank 10 detected by a pressure sensor 11 are inputted.

The vaporized fuel taken in from the canister 13 to the intake manifold 20 is mixed with the combustion fuel that is to be supplied to the internal combustion engine 2 from the injector or the like. The mixed fuel is combusted in the cylinder of the internal combustion engine 2. In the cylinder of the internal combustion engine 2, an air-fuel ratio that is a mixture ratio of the combustion fuel and the intake air is controlled at a predetermined air-fuel ratio. The controller 3 adjusts a purged amount of the vaporized fuel so as to maintain the predetermined air-fuel ratio by the duty control of the opening time period and the closing time period of the purge valve 15.

The fuel vapor gas purge system 1 is a system that prevents release of the vaporized fuel generated in the fuel tank 10 to the atmosphere. However, there is concern that the vaporized fuel is release to the atmosphere from a leakage point when a hole or leakage is generated in the vaporized fuel purging system, or when a device is detached from the intake pipe 22. Moreover, since the abnormality such as the generated hole and leakage may not exert a significant degree of influence on an operation of the internal combustion engine 2, a driver of the vehicle may leave the abnormality without awareness thereof.

The system 1 of the first embodiment determines whether there is an abnormality in a passage of the purging system, and is capable of detecting the abnormality such as a leakage in the purging system quickly. An abnormality detection control will be described with referring to the flowchart of FIG. 4 and the diagram of FIG. 5. The controller 3 executes control processes according to the flowchart of FIG. 4. The control processes of the flowchart are performed regardless of whether the vehicle is running and the internal combustion engine 2 is operated, or whether the vehicle is parked and the internal combustion engine 2 is stopped. The abnormality detection control of the system 1 may be performed at regular intervals regardless of whether the internal combustion engine 2 is turned on or off.

Figure 4:
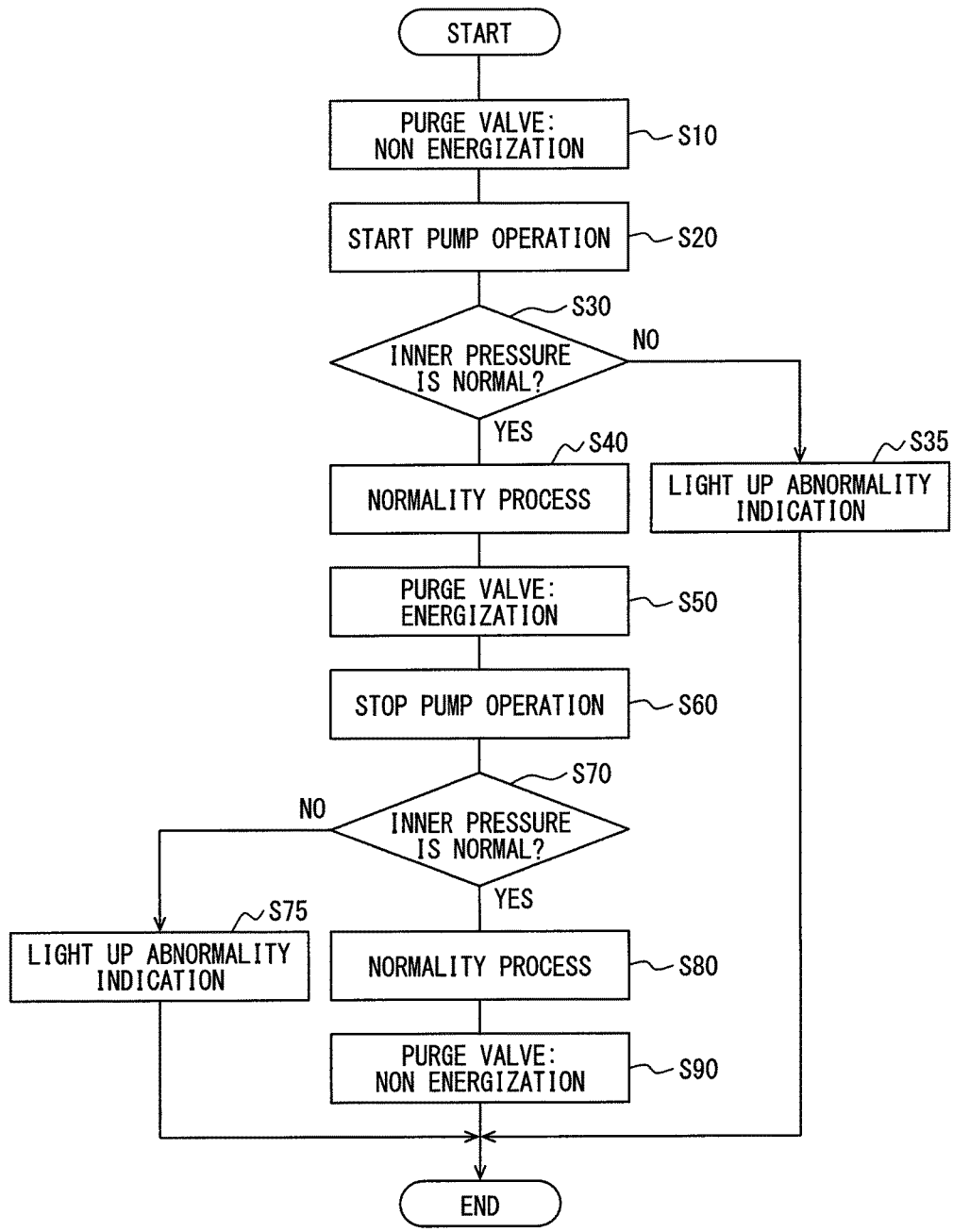
FIG. 4 is a flowchart showing a control for detection of abnormality such as leakage in the fuel vapor gas purge system according to the first embodiment.

When the flowchart of FIG. 4 starts, the controller 3, at step S10, controls the purge valve 15 to be in the non-energized state where a current is not supplied to the electric circuit 1510. The purge valve 15 is controlled to be in the closed state. The controller 3 starts an operation of the inner pump 121 at step S20. Accordingly, the passage from the inner part of the fuel tank 10 to the purge valve 15 becomes a closed space. The passage from the inner part of the fuel tank 10 to the purge valve 15 is an object passage that is to be checked whether there is a leakage. Since gas in the object passage is discharged to outside by the inner pump 121, the inner pressure of the fuel tank 10 becomes negative relative to the atmosphere pressure, i.e. becomes lower than the atmosphere pressure.

The controller 3 maintains this state for a certain period of time so as to provide a determinable state in which an abnormality of the object passage is detectable. At step S30, the controller 3 acquires a signal corresponding to the inner pressure of the fuel tank 10 detected by the pressure sensor 11, and the abnormality determination circuit 30 determines whether a first normality condition is met. The first normality condition is a condition for determination in the determinable state whether the object passage is in a normal state where there is no abnormality such as leakage.

Figure 5:
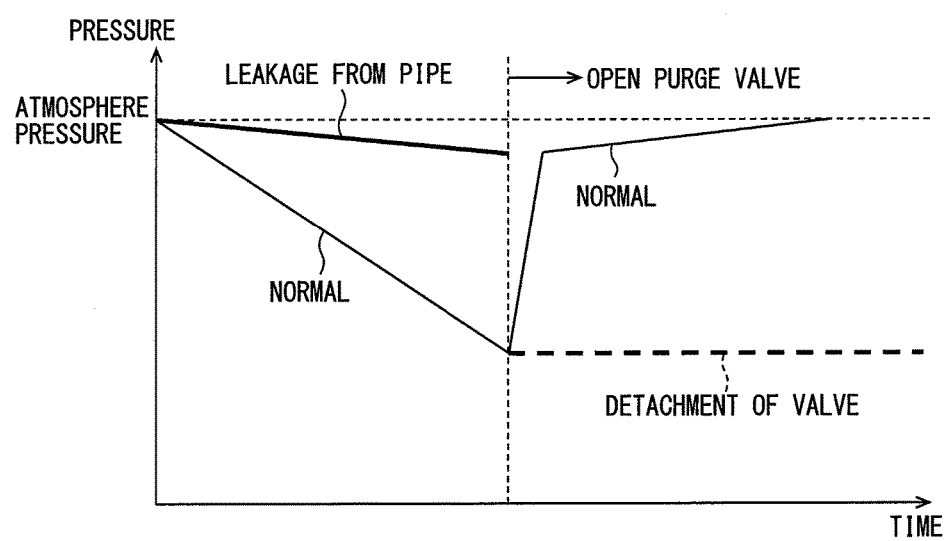
FIG. 5 is a diagram showing a pressure change in a normal state and an abnormal state in which the purge valve is, for example, detached.

If there is no leakage from the object passage in this state, a pressure of the closed passage changes to decrease continuously from the atmosphere pressure in accordance with operation of the inner pump 121 as shown in a normal pressure change of the left half of FIG. 5. If there is a leakage from the object passage conversely, the gas in the object passage leaks from the leakage point to outside. In this case, the negative state of the detected pressure is not accelerated as indicated by a bold solid line "leakage from pipe" in FIG. 5, in other words, the detected pressure does not decrease sharply as compared to the normal pressure change. The first normality condition is met, for example, when a pressure change per unit time (pressure change rate) is higher than or equal to a predetermined rate. Therefore, when the pressure change rate is lower than the predetermine rate, the abnormality determination circuit 30 determines that the object passage has an abnormality. When the pressure change rate is higher than or equal to the predetermine rate, the abnormality determination circuit 30 determines that the object passage is normal.

The abnormality determination circuit 30 determines at step S30 that the first normality condition is not met, the controller 3 indicates that the object passage is in an abnormal state at step S35, and the present abnormality detection control is terminated. When a predetermined period of time elapses after the termination of the control, the control operation of step S10 is started again. The abnormality detection control of the system 1 is performed at regular intervals regardless of whether the internal combustion engine 2 is operated.

The abnormality indication at step S35 may be performed by lighting up or blinking a predetermined lamp or by showing the abnormality on a predetermined viewing surface, in order to indicate that the object passage has the abnormality. Alternatively, the abnormality indication may be performed by generating a warning sound or a sound informing a driver with the abnormality.

When the abnormality determination circuit 30 determines at step S30 that the first normality condition is met, the determination results is that the object passage is normal. Thus, a normality process is performed at step S40 to determine that the object passage is normal. In order to determine next whether the purge valve 15 as an example of the valve device is detached, the controller 3, at step S50, controls the purge valve 15 to be in the energized state where a current is supplied to the electric circuit 1510. The controller 3 stops the operation of the inner pump 121 at step S60. Accordingly, a communication is established from the inner part of the fuel tank 10 to the intake passage.

The controller 3 maintains this state for a certain period of time so as to provide a determinable state in which an abnormality of the purge valve 15, i.e. the valve device is detectable. At step S70, the controller 3 acquires a second pressure value corresponding to the inner pressure of the fuel tank 10 detected by the pressure sensor 11. The abnormality determination circuit 30 determines whether a second normality condition is met by comparing the second pressure value and a first pressure value that is detected before the control operation of step S60. The second normality condition is a condition for determination in the determinable state whether the valve device is in a normal state where there is no abnormality such as detachment. When an abnormality occurs in the valve device, the valve device may be in the non-energized state in which the electric circuit 1510 is opened due to detachment of the valve device from the intake pipe 22, or the valve device may be in the non-energized state due to an abnormality of another electric circuit.

When the valve device has no abnormality, the second pressure value corresponding to the inner pressure of the fuel tank 10 changes to increase sharply and approach the atmosphere pressure from the first pressure value detected at the time of the normality process of step S40, as shown in a normal pressure change of the right half of FIG. 5. A degree of the sharp change depends on a characteristic of the purge valve 15 that is the valve device being used. On the other hand, when the valve device has an abnormality such as detachment of the valve device, the valve device is in a state closing the passage, i.e. the object passage remains closed. Therefore, the second pressure value that is a detected pressure inside the fuel tank 10 is approximately equal to the first pressure value or does not change greatly from the first pressure value, as indicated by a bold dashed line "detachment of valve" of FIG. 5. The second normality condition is met when the second pressure value does not change greatly from the first pressure value. Therefore, the abnormality determination circuit 30 determines that the valve device has an abnormality when the second pressure value changes by a predetermined value or more from the first pressure value. The abnormality determination circuit 30 determines that the valve device is normal when a change amount of the second pressure value is less than the predetermined value.

When the abnormality determination circuit 30 determines at step S70 that the second normality condition is not met, the controller 3 indicates an abnormal state at step S75 similar to the above-described control operation of step S35, and the present abnormality detection control is terminated.

When the abnormality determination circuit 30 determines at step S70 that the second normality condition is met, the controller 3 performs a normality process at step S80 to determine that the valve device is normal. At next step S90, the controller 3 controls the purge valve 15 to be in the non-energized state where a current is not supplied to the electric circuit 1510 so as to stop supply of the vaporized fuel to the intake passage. Accordingly, the abnormality detection control is terminated so as to stop energization of the purge valve 15.

The abnormality detection control can be performed at both a time of vehicle running and a time of vehicle parking. The abnormality detection control is preferable to be performed at the time of vehicle parking because the engine is stopped during the vehicle parking and it is easy to detect the pressure change exactly. Moreover, since a purging process cannot be performed during the leakage check, it is beneficial to perform the abnormality detection control at the time of vehicle parking in terms of an operating efficiency of the system 1.

Next, functions and effects of the fuel vapor gas purge system 1 of the first embodiment will be described. The system 1 includes the fuel tank 10, the canister 13, the passage forming member that forms the intake passage of the internal combustion engine 2, the purge pump 14 pumping the vaporized fuel in the canister 13 to the intake passage through the purge passage 17, the valve device, the electric circuit 1510, and the switch portion 1511. The valve device includes the valve element 152 switchable between an allowed state in which the vaporized fuel is allowed to flow into the intake passage and a blocked state in which the inflow of the vaporized fuel into the intake passage is blocked. The valve device is attached to the passage forming member and controls a flow of the vaporized fuel pumped by the purge pump 14. The electric circuit 1510 is provided in the valve device and generates an electromagnetic force by energization thereof. The electric circuit 1510 is capable of driving the valve element 152 to be in the blocked state where the electromagnetic force is not generated or in the allowed state where the electromagnetic force is generated. The switch portion 1511 forms an electric contact portion that provides the conductive state where the electric circuit 1510 is closed or the nonconductive state where the electric circuit 1510 is open. The conductive state is provided when the valve device is attached to the passage forming member, and the nonconductive state is provided when the valve device is detached from the passage forming member.

The electric circuit 1510 is at least an electric circuit being provided in the valve device and generating a driving force by energization to drive the valve element 152. Hence, the electric circuit 1510 is capable of driving the valve element 152 in the blocked state where the driving force is not generated or in the allowed state where the driving force is generated. For example, the driving force may be constituted not only by the electromagnetic force by a solenoid portion but a force of a motor driving the valve element 152.

According to the system 1, when the valve device is attached to the passage forming member, the electric circuit 1510 is set in the conductive state by the switch portion 1511. Thus, the valve element 152 can be switched into the allowed state upon energization of the electric circuit 1510. On the other hand, when the valve device is detached from the passage forming member, the electric circuit 1510 is set in the nonconductive state by the switch portion 1511. In this case, the valve element 152 is set in the blocked state even upon energization of the electric circuit 1510. Therefore, even when the valve device is, for example, detached from the intake passage of the internal combustion engine 2, the vaporized fuel from the canister 13 is sealed by the valve device. Hence, leakage of the vaporized fuel from a detached part can be avoided. Accordingly, the fuel vapor gas purge system 1 is capable of limiting leakage of the vaporized fuel to outside when the valve device is, for example, detached.

The system 1 includes the controller 3 controlling operation of the inner pump 121 and energization of the electric circuit 1510 of the valve device. The controller 3 operates the inner pump 121 for a certain period of time in a state where the electric circuit 1510 is not energized, and then detects the first pressure value that is a pressure at a predetermined position of a passage from the inner part or a fill opening of the fuel tank 10 to the valve device. The controller 3 next detects the second pressure value that is a pressure at the above-described predetermined position with stopping the operation of the inner pump 121 and energizing the electric circuit 1510. When the second pressure value does not change sharply from the first pressure value, the controller 3 determines that the valve device is in an abnormal state.

The system 1 is capable of detecting whether the valve device is in the abnormal state such as a detached state, by using the first pressure value and the second pressure value. The first pressure value is detected when the inner pump 121 is operated in a state where the energization is stopped and the valve device is closed. The second pressure value is detected in a state where the energization starts and the inner pump 121 is stopped after the detection of the first pressure value. The first pressure value is a detection value in a state the inner pump 121 is operated while the valve device is closed. The second pressure value is a detection value in a state where the inner pump 121 is stopped while the valve device is open. When the valve device is normal without having an abnormality, the sealed vaporized fuel is capable of transferring to the intake passage through the valve device. Therefore, the second pressure value rapidly approaches the atmosphere pressure.

When the valve device is abnormal, for example, detached from the intake passage, the valve device becomes in a closed state actually despite controlling of the valve device into an open state. Thus, the vaporized fuel is still sealed within the passage closed by the valve device. Therefore, when the second pressure value does not change much from the first pressure value, the controller 3 is capable of detecting appropriately that the valve device is in an abnormal state. The system 1 is capable of limiting false detection of abnormality in the valve device.

Second Embodiment

A vapor fuel gas purge system according to a second embodiment will be described referring to FIGS. 6 and 7. In each figures, a component similar to that of the first embodiment is assigned with the same numeral and exerts similar functions and effects. Configurations, functions and effects which are not described specifically in the second embodiment are similar to those of the first embodiment. Hereinafter, in the second embodiment, only a point different from the above-described embodiment will be described. In the second embodiment, a component including similar configurations to that of the above-described embodiment exerts similar functions and effects described in the above-described embodiment.

Figure 6:
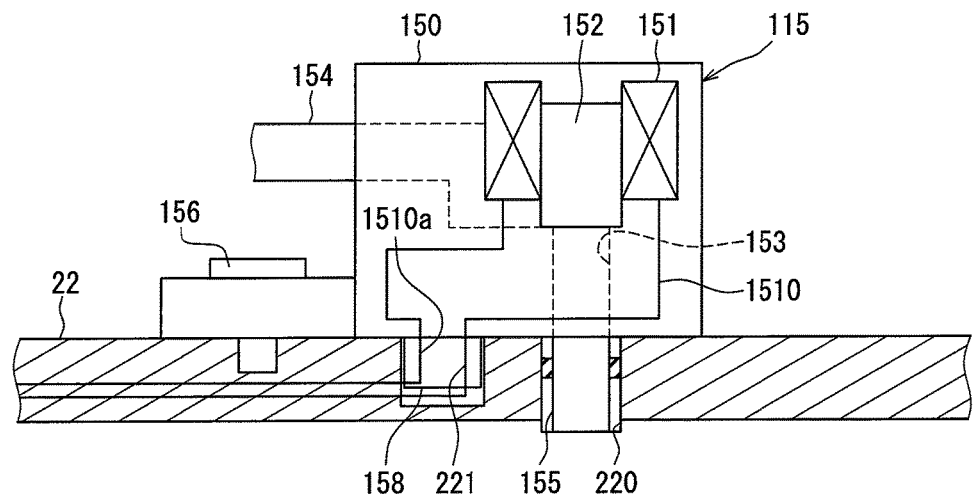
FIG. 6 is a schematic diagram illustrating a connection structure between a purge valve and an intake pipe in the fuel vapor gas purge system according to a second embodiment of the present disclosure.

As shown in FIG. 6, a purge valve 115 as an example of the valve device is different from the first embodiment in configuration regarding a switch portion 221. A contact terminal 1510a of an electric circuit 1510 is connected to the switch portion 221 used for connecting to an electric wire to which a current is supplied from outside. The electric circuit 1510 is energized through the electric wire extending from the switch portion 221. The switch portion 221 is provided in the intake pipe 22, i.e. inside a passage forming member. The contact terminal 1510a is built in a connector 158, and the connecter 158 is disposed to be inserted into the passage forming member. Thus, the contact terminal 1510a is in contact with the switch portion 221, and thereby the electric circuit 1510 is in a conductive state where the electric circuit 1510 is closed. The electric wire may be disposed inside the intake pipe 22 together with the switch portion 221. Therefore, the contact terminal 1510a is set to be in the conductive state or a nonconductive state where the electric circuit 1510 is open, by the switch portion 221 provided in the intake pipe 22.

As shown in FIG. 6, when the valve device is appropriately attached to the intake pipe 22, the switch portion 221 is in contact with the contact terminal 1510a to provide the conductive state of the electric circuit 1510. In this case, the electric circuit 1510 becomes the conductive state through the electric wire extending from the switch portion 221, and an electromagnetic coil 151 generates an electromagnetic force that drives a valve element 152 to open a fuel supply passage 153.

Figure 7:
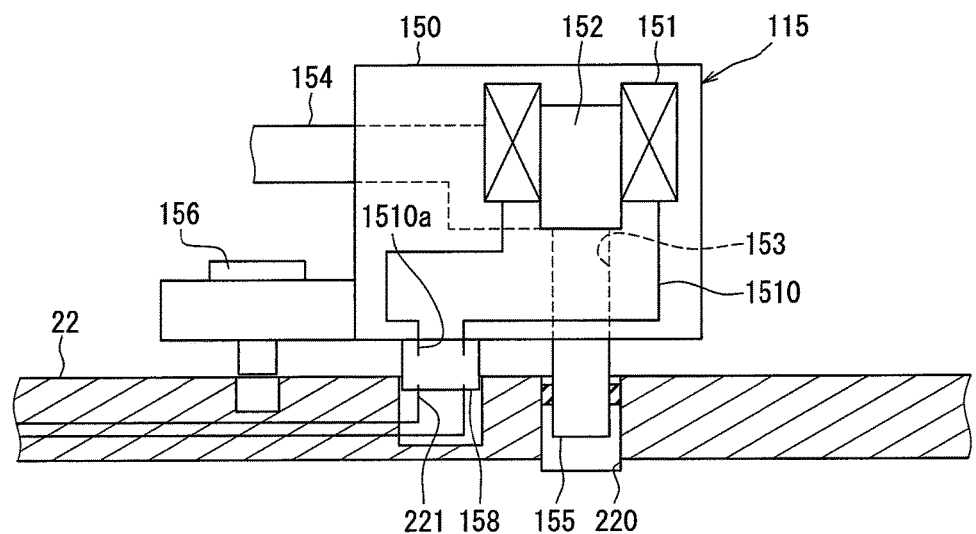
FIG. 7 is a schematic diagram illustrating a state where the purge valve is detached from the intake pipe.

As shown in FIG. 7, a fastening force by a fastening portion 156 does not function appropriately, and when the valve device is detached from the intake pipe 22, the switch portion 221 and the contact terminal 1510a are separated from each other. In this case, the electric circuit 1510 becomes an open circuit and provides the nonconductive state. Since a current does not flow in the electric circuit 1510, the electromagnetic force is not generated, and the fuel supply passage 153 remains closed by the valve element 152. Therefore, when the valve device is detached from the intake pipe 22, the vaporized fuel is blocked inside the valve device due to the closed state of the valve element 152. A closed passage from an inner part of a fuel tank 10 to an inner part of the valve device is provided, accordingly.

Third Embodiment

An abnormality detection control of a fuel gas purge system according to a third embodiment will be described with reference to FIG. 8. Configurations, functions and effects which are not described specifically in the third embodiment are similar to those of the above-described embodiments. Hereinafter, in the third embodiment, only a point different from the above-described embodiments will be described. In the third embodiment, a component including similar configurations to that of the above-described embodiments exerts similar functions and effects described in the above-described embodiments.

The abnormality detection control described in the third embodiment is different from the control of the first embodiment in that a current is supplied to the valve device from the start, and a pump is operated in a process for leakage check.

Figure 8:
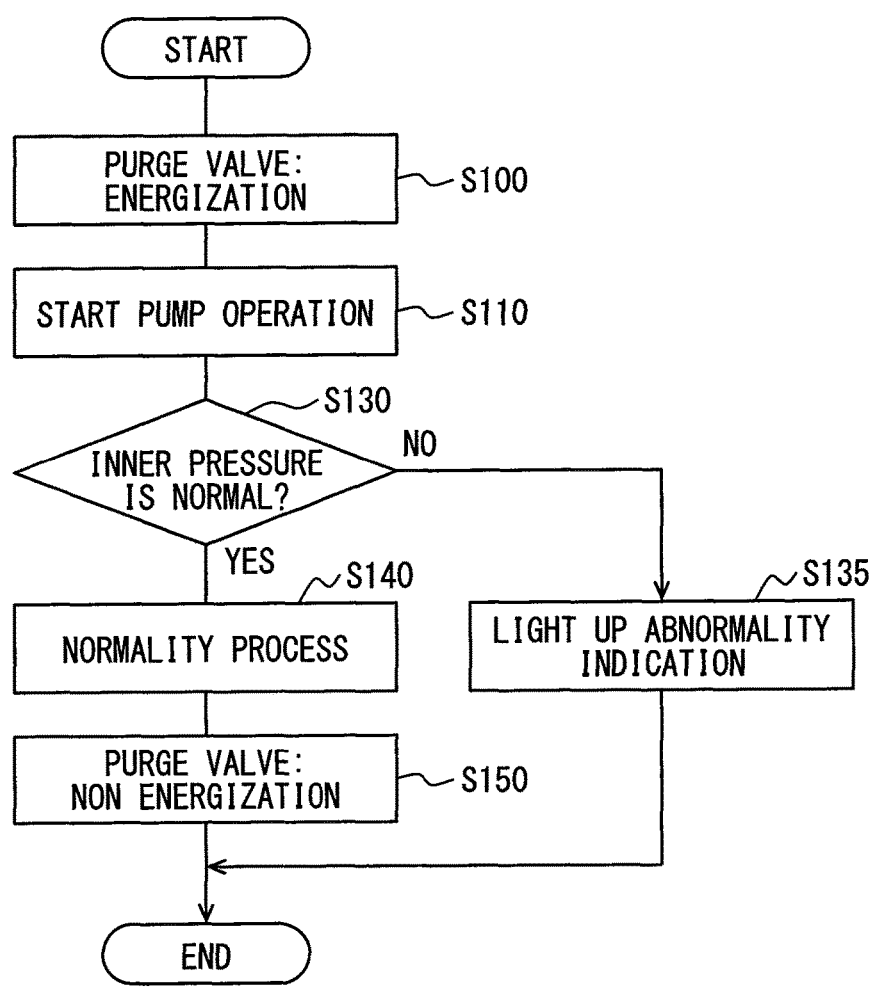
FIG. 8 is a flowchart showing a control for detection of detachment of a purge valve in a fuel vapor gas purge system according to a third embodiment of the present disclosure.

When the flowchart of FIG. 8 starts, a controller 3 controls a purge valve 15 to be in a state where a current is supplied to the electric circuit 1510 at step S100. The controller 3, at step S110, starts to operate an inner pump 121. The controller 3 keeps this state for a certain period of time, and then, at step S130, acquires a signal regarding an inner pressure of a fuel tank 10 detected by a pressure sensor 11. An abnormality determination circuit 30 of the controller 3 determines whether a normality condition is met. The normality condition is a condition for determination whether an object passage has an abnormality such as leakage.

When the object passage is normal and does not have leakage or the like, an inner part of the fuel tank 10 communicates with an intake passage. Hence, an inner pressure of the fuel tank 10 slightly deviates from an atmosphere pressure positively or negatively. The positive deviation is caused by a control of the inner pump 121 to send a gas in the object passage toward the fuel tank 10, and the negative deviation is caused by a control of the inner pump 121 to send the gas in the object passage toward the intake passage. On the other hand, when there is an abnormality such as detachment of the valve device, the valve device closes the passage, and the object passage is blocked. Hence, the detected inner pressure of the fuel tank 10 significantly deviates from the atmosphere pressure positively or negatively. Therefore, when the detected pressure value changes greatly from the atmosphere pressure, the abnormality determination circuit 30 determines that there is an abnormality. When the amount of the change is small, the abnormality determination circuit 30 determines that it is normal.

When the abnormality determination circuit 30 determines that the normality condition is not met at step S130, the controller 3 indicates that the valve device is in an abnormal state at step S135, and then terminates the present abnormality detection control. Upon a lapse of a predetermined time period after the termination of control, the control operation of step S100 starts again. The abnormality indication at step S135 may be performed in a similar manner to the abnormality indication of the first embodiment.

When the abnormality determination circuit 30 determines that the normality condition is met at step S130, the determination results is that the valve device is normal. Thus, a normality process is performed at step S140. The controller 3, at next step S150, controls the purge valve 15 to be in a state where a current is not supplied to the electric circuit 1510, i.e. supply of the vaporized fuel to the intake passage is stopped. Accordingly, the abnormality detection control is terminated with stopping the energization of the purge valve 15.

According to the system 1 of the third embodiment, the controller 3 performs an energization of the electric circuit 1510. Additionally, the controller 3 activates the inner pump 121 and then determines whether the valve device is in an abnormal state. The controller 3 determines that the valve device is in the abnormal state when the pressure value obtained by detecting a pressure at a predetermined position between an inner part or a fill opening of the fuel tank 10 and the valve device does not change sharply from the atmosphere pressure.

According to the control, whether the valve device is in the abnormal state such as a detached state can be detected by using the pressure value that is detected with energizing the electric circuit 1510 and operating the inner pump 121. When the valve device is normal and does not have an abnormality, the sealed vaporized fuel is capable of transferring to the intake passage through the valve device in an open state. Therefore, the detected pressure value becomes close to the atmosphere pressure. When the valve device is detached and is abnormal, the valve device is actually in a closed state despite a controlling of the valve device to be in an open state. Thus, the vaporized fuel is sealed in the passage closed by the valve device. When the inner pump 121 is activated in this state, and when the detected pressure value changes greatly from the atmosphere pressure, the controller 3 is capable of detecting appropriately that the valve device is in the abnormal state.

The disclosure of the present specification is not limited to the above-exemplified embodiments. The disclosure includes the above-exemplified embodiments and modification thereof by a skilled person. For example, the disclosure is not limited to the components or the combinations of elements described in the embodiments, and can be modified variously to be exploited. The disclosure can be exploited in a variety of combinations. The disclosure may include any additive part that can be added to the embodiments. The disclosure includes a modification in which a part or an element of the embodiment is omitted. The disclosure includes a modification in which components or elements are replaced or combined between two of the above-described embodiments. The scope of the disclosure is not limited to the descriptions of the embodiments. Although the present disclosure has been fully described in connection with the preferred embodiments thereof with reference to the accompanying drawings, it is to be noted that various changes and modifications described below will become apparent to those skilled in the art.

In the above-described embodiments, the pressure sensor 11 is an example of a detector detecting a pressure at the predetermined position between the inner part or the fill opening of the fuel tank 10 and the purge valve 15 that is the valve device. Alternatively, the pressure at the predetermined position may be detected by a sensor provided in the purge passage 17 or the vapor passage 16.

In the above-described embodiments, the purge valve 15 is adopted as the valve device attached to the intake pipe 22. The valve device is at least a device including a valve switchable between a fully open state where a communication passage communicating with the intake passage of the internal combustion engine 2 is open and a fully closed state where the communication passage is closed. For example, the valve device may be at least an opening and closing valve that is switchable between the fully open state and the fully closed state, and the purge valve 15 capable of adjusting an open degree of the passage may be disposed adjacent to the canister 13 rather than the valve device. The valve device attached to the intake pipe 22 may include therein the purge pump 14 and the purge valve 15. In the above-described embodiments, the system 1 may not include a turbocharger or a throttle valve.

The abnormality detection control of the first embodiment may be performed as described below. The inner pump 121 at step S20 of FIG. 4 is operated to release gas to outside, but may be operated to take in gas from the outside to the purge passage. In this case, the pressure change shown in FIG. 5 becomes as described below. When there is no leakage from the object passage, the normal pressure change in the left half of FIG. 5 is changed to increase from the atmosphere pressure in accordance with operation of the inner pump 121. When there is leakage from the object passage, the detected pressure is not accelerated to change positively and does not increase much as compared to the normal pressure change. Further, when the valve device has no abnormality, the normal pressure change in the right half of FIG. 5 is changed such that the second pressure value sharply decreases to approach the atmosphere pressure from the first pressure value that is detected at the time of the normality process of step S40. When the valve device has an abnormality, e.g. is detached, the second pressure value is approximately equal to the first pressure value or does not change greatly from the first pressure value.

The abnormality detection control of the first embodiment may be performed as described below. The inner pump 121 controlled at steps S20 and S60 of FIG. 4 may be replaced with the purge pump 14. In this case, the CCV 120 is closed, and the purge valve 15 is controlled to be in a state a current is supplied to the electric circuit 1510. Then, the purge pump 14 is started to be operated. The operation of the purge pump 14 continues for a certain period of time, and the controller 3 acquires a signal regarding the inner pressure of the fuel tank 10 detected by the pressure sensor 11. When the acquired pressure value greatly changes from the atmosphere pressure, the abnormality determination circuit 30 determines that the purge valve 15 is controlled to be in the open state normally. When the acquired pressure value does not change greatly from the atmosphere pressure, the abnormality determination circuit 30 determines that the purge valve 15 is not controlled to be in the open state normally, for example, determines that the purge valve 15 is detached from the intake pipe 22.

When the purge pump 14 is controlled to send gas to the intake passage, the above-described acquired pressure value becomes lower than the atmosphere pressure in a normal state of the purge valve 15. When the purge pump 14 is controlled to send gas to the fuel tank 10, the above-described acquired pressure value becomes higher than the atmosphere pressure in the normal state of the purge valve 15.

Therefore, the controller 3 operates the purge pump 14 for a certain period of time in a state where energization of the electric circuit 1510 is performed, and then detects a pressure value at the predetermined position of a passage from the inner part or the fill opening of the fuel tank 10 to the valve device. When the pressure value does not change greatly from the atmosphere pressure, the controller 3 determines that the valve device is in the abnormal state.

The system 1 is capable of detecting whether the valve device is in the abnormal state, for example, is detached, by using the pressure value that is detected via operation of the purge pump 14 in an energized and open state of the valve device. When the valve device has no abnormality and is normal, gas in the object passage is capable of transferring to the intake passage through the valve device in the open state, and thus the pressure value clearly changes from the atmosphere pressure.

When the valve device is, for example, detached and is abnormal, the valve device becomes in the closed state despite setting of the valve device to be in the open state. Hence, gas in the object passage is sealed in the passage closed by the valve device. Accordingly, the controller 3 is capable of detecting the abnormal state of the valve device when the detected pressure value does not change much from the atmosphere pressure. The system 1 is capable of limiting false detection of abnormality in the valve device.

When the inner pump 121 controlled at steps S20 and S60 of FIG. 4 is replaced with the purge pump 14, the abnormality detection control of the first embodiment may be performed also as described below. The controller 3 may acquire a first pressure value and a second pressure value. The first pressure value may be acquired by detecting a pressure at a predetermined position of a passage from an inner part or a fill opening of the fuel tank 10 to the valve device after a predetermined time period of the operation of the purge pump 14 without performing the energization of the electric circuit 1510. The second pressure value may be acquired by detecting an inner pressure of the fuel tank 10 with stopping the operation of the purge pump 14 and with performing the energization of the electric circuit 1510 subsequent to the acquisition of the first pressure value. The controller 3 may determine that the valve device is in an abnormal state when the second pressure value does not change sharply from the first pressure value.

The abnormality detection control of the third embodiment may be performed as described below. The inner pump 121 at step S110 of FIG. 8 is operated to release gas to outside, but may be operated to take in gas from the outside to the purge passage.

The abnormality detection control of the first embodiment may be performed as described below. For example, the controller 3 is capable of detecting whether the valve device is normal based on whether a signal indicating a purging state can be acquired from an engine ECU of the vehicle. The controller 3 may perform the abnormality detection control by checking an energization state of the electric circuit 1510 when a current is supplied to the electric circuit 1510. For example, the controller 3 detects a pressure pulsation generated at the time of a duty control of the purge valve 15 and is capable of detecting whether the valve device is normal by using the pressure pulsation. The controller 3 may detect an energizing current value and may detect whether the valve device is normal by using the energizing current value. The controller 3 may detects an air-fuel ratio at the time of the duty control of the purge valve 15, and may detect whether the valve device is normal by using a change of the air-flow ratio.

Additional advantages and modifications will readily occur to those skilled in the art. The disclosure in its broader terms is therefore not limited to the specific details, representative apparatus, and illustrative examples shown and described.

What is claimed is:

1. A fuel vapor gas purge system comprising:
a fuel tank accumulating a fuel;
a canister adsorbing a vaporized fuel when a fuel vapor gas generated in the fuel tank is introduced into the canister, and being capable of desorbing the adsorbed vaporized fuel;
a passage forming member forming an intake passage of an internal combustion engine, the internal combustion engine mixing and combusting the vaporized fuel desorbed from the canister and a combustion fuel;
a purge pump pumping the vaporized fuel in the canister to the intake passage through a purge passage;
a valve device including a valve element switchable between an allowed state in which the vaporized fuel is allowed to flow into the intake passage and a blocked state in which the flow of the vaporized fuel into the intake passage is blocked, the valve device being attached to the passage forming member and controlling a flow of the vaporized fuel pumped by the purge pump;
an electric circuit disposed in the valve device and energized to generate a driving force to drive the valve element, the electric circuit being capable of driving the valve element into the blocked state when the driving force is not generated or into the allowed state when the driving force is generated; and
a switch portion including an electric contact portion that causes the electric circuit to be in a conductive state in which the electric circuit is closed when the valve device is attached to the passage forming member, and causes the electric circuit to be in a nonconductive state in which the electric circuit is open when the valve device is detached from the passage forming member.

2. The fuel vapor gas purge system according to claim 1, further comprising:
an inner pump provided integrally with the canister, the inner pump discharging gas to an atmosphere or sucking air from the atmosphere; and
a controller controlling an operation of the inner pump and the energization of the electric circuit, wherein
the controller acquires a first pressure value and a second pressure value, the first pressure value is acquired by detecting a pressure at a predetermined position of a passage from an inner part or a fill opening of the fuel tank to the valve device after a predetermined time period of the operation of the inner pump without performing the energization of the electric circuit, and the second pressure value is acquired by detecting an inner pressure of the fuel tank with stopping the operation of the inner pump and with performing the energization of the electric circuit subsequent to the acquisition of the first pressure value, and the controller determines that the valve device is in an abnormal state when the second pressure value does not change sharply from the first pressure value.

3. The fuel vapor gas purge system according to claim 1, further comprising a controller controlling an operation of the purge pump and the energization of the electric circuit, wherein the controller calculates a pressure value at a predetermined position of a passage from an inner part or a fill opening of the fuel tank to the valve device after a predetermined time period of the operation of the purge pump with performing the energization of the electric circuit, and the controller determines that the valve device is in an abnormal state when the pressure value does not change much from the atmosphere pressure.

4. The fuel vapor gas purge system according to claim 1, further comprising:

an inner pump provided integrally with the canister, the inner pump discharging gas to an atmosphere or sucking air from the atmosphere; and a controller controlling an operation of the inner pump and the energization of the electric circuit, wherein the controller acquires a pressure value by detecting a pressure at a predetermined position of a passage from an inner part or a fill opening of the fuel tank to the valve device when the operation of the inner pump and the energization of the electric circuit are performed, and the controller determines that the valve device is in an abnormal state when the pressure value changes from the atmosphere pressure.

5. The fuel vapor gas purge system according to claim 1, further comprising:

a controller controlling an operation of the purge pump and the energization of the electric circuit, wherein the controller acquires a first pressure value and a second pressure value, the first pressure value is acquired by detecting a pressure at a predetermined position of a passage from an inner part or a fill opening of the fuel tank to the valve device after a predetermined time period of the operation of the purge pump without performing the energization of the electric circuit, and the second pressure value is acquired by detecting an inner pressure of the fuel tank with stopping the operation of the purge pump and with performing the energization of the electric circuit subsequent to the acquisition of the first pressure value, and the controller determines that the valve device is in an abnormal state when the second pressure value does not change sharply from the first pressure value.

* * * * *